United States Patent
Yousefpor

(10) Patent No.: US 10,126,850 B2
(45) Date of Patent: Nov. 13, 2018

(54) ACTIVE INTEGRATED TOUCH/DISPLAY

(71) Applicant: Apple Inc., Cupertino, CA (US)

(72) Inventor: Marduke Yousefpor, San Jose, CA (US)

(73) Assignee: APPLE INC., Cupertino, CA (US)

( * ) Notice: Subject to any disclaimer, the term of this patent is extended or adjusted under 35 U.S.C. 154(b) by 432 days.

(21) Appl. No.: 14/106,283

(22) Filed: Dec. 13, 2013

(65) Prior Publication Data
US 2015/0049045 A1    Feb. 19, 2015

Related U.S. Application Data

(60) Provisional application No. 61/866,809, filed on Aug. 16, 2013.

(51) Int. Cl.
*G06F 3/041* (2006.01)
*G06F 3/044* (2006.01)
*G02F 1/1345* (2006.01)

(52) U.S. Cl.
CPC ........ *G06F 3/0412* (2013.01); *G02F 1/13452* (2013.01); *G06F 3/044* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,084,860 B1 * | 8/2006 | Jaeger | G06F 3/0416 178/18.01 |
| 7,184,064 B2 | 2/2007 | Zimmerman et al. | |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems,* pp. 21-25.

(Continued)

*Primary Examiner* — Jennifer Mehmood
*Assistant Examiner* — Parul Gupta
(74) *Attorney, Agent, or Firm* — Morrison & Foerster LLP

(57) ABSTRACT

An integrated touch sensitive display is provided. The integrated touch sensitive display can include rows and columns of touch electrodes. Various modulation techniques can be applied to one or more of the touch electrodes to allow sense circuitry to individually measure a capacitance associated with each of the touch electrodes. The capacitances can be used to determine a location and/or amount of touch or hover events at or near the integrated touch sensitive display.

16 Claims, 15 Drawing Sheets

(56) References Cited

U.S. PATENT DOCUMENTS

| | | |
|---|---|---|
| 7,663,607 B2 | 2/2010 | Hotelling et al. |
| 7,995,041 B2 | 8/2011 | Chang |
| 8,040,326 B2 | 10/2011 | Hotelling et al. |
| 8,479,122 B2 | 7/2013 | Hotelling et al. |
| 8,537,126 B2 | 9/2013 | Yousefpor et al. |
| 8,552,989 B2 * | 10/2013 | Hotelling ............ G02F 1/13338 345/173 |
| 2002/0003521 A1 * | 1/2002 | Matsueda ............ G09G 3/2011 345/89 |
| 2004/0183787 A1 * | 9/2004 | Geaghan ................ G06F 3/044 345/173 |
| 2006/0197753 A1 | 9/2006 | Hotelling |
| 2014/0152602 A1 * | 6/2014 | Miyamoto ............ G06F 3/0416 345/173 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

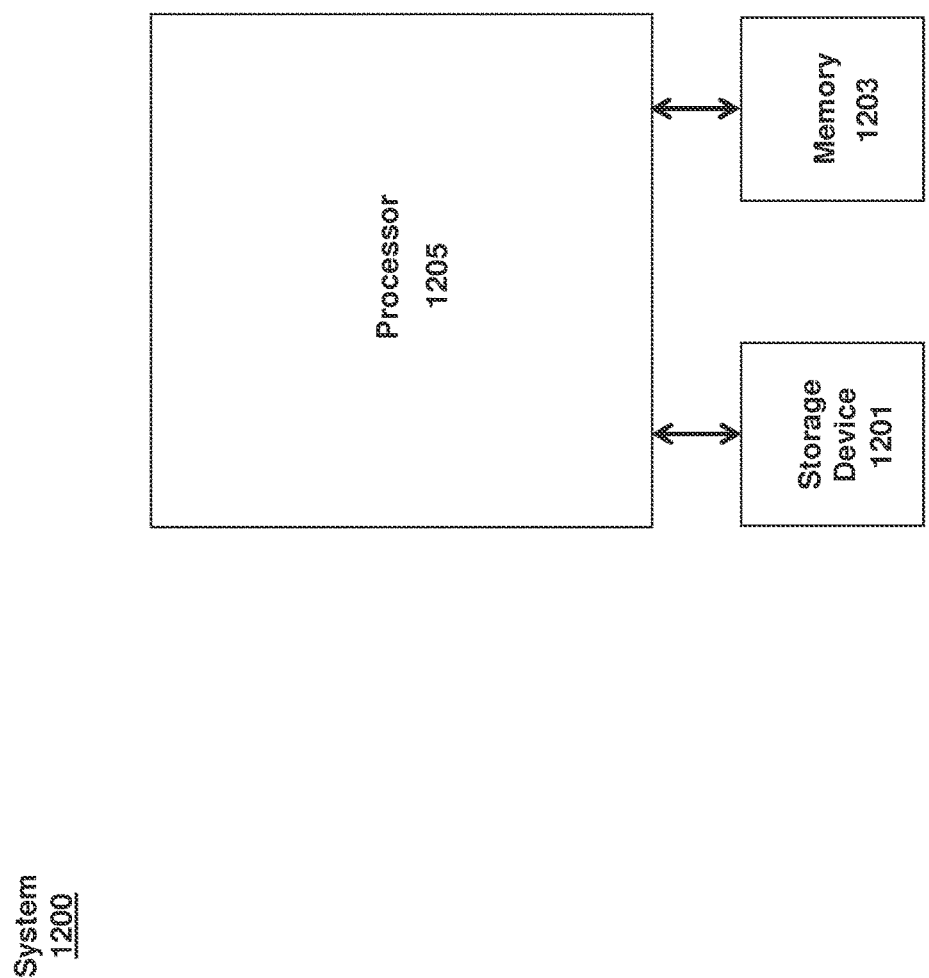

Personal Device 1400

Personal Device 1300

Personal
Device
1600

Personal
Device
1500

ACTIVE INTEGRATED TOUCH/DISPLAY

FIELD

This relates generally to touch sensitive devices and, more specifically, to touch sensitive devices having an integrated touch sensor and display.

BACKGROUND

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus, or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

In some applications, the touch sensor panel and the display device can be integrated into a single unit to reduce the space needed by these devices. However, when a touch sensor panel is integrated with a display, crosstalk can occur between the touch sensor stimulation signals and the display signals used to control the display panel.

SUMMARY

An integrated touch sensitive display is provided. The integrated touch sensitive display can include rows and columns of touch electrodes. Various modulation techniques can be applied to one or more of the touch electrodes to allow sense circuitry to individually measure a capacitance associated with each of the touch electrodes. The capacitances can be used to determine a location and/or amount of touch or hover events at or near the integrated touch sensitive display.

BRIEF DESCRIPTION OF THE DRAWINGS

FIG. 12 illustrates an exemplary system for operating an integrated touch sensitive display according to various examples.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to an integrated touch sensitive display. The integrated touch sensitive display can include rows and columns of touch electrodes. Various modulation techniques can be applied to one or more of the touch electrodes to allow sense circuitry to individually measure a capacitance associated with each of the touch electrodes. The capacitances can be used to determine a location and/or amount of touch or hover events at or near the integrated touch sensitive display.

Figure 1:
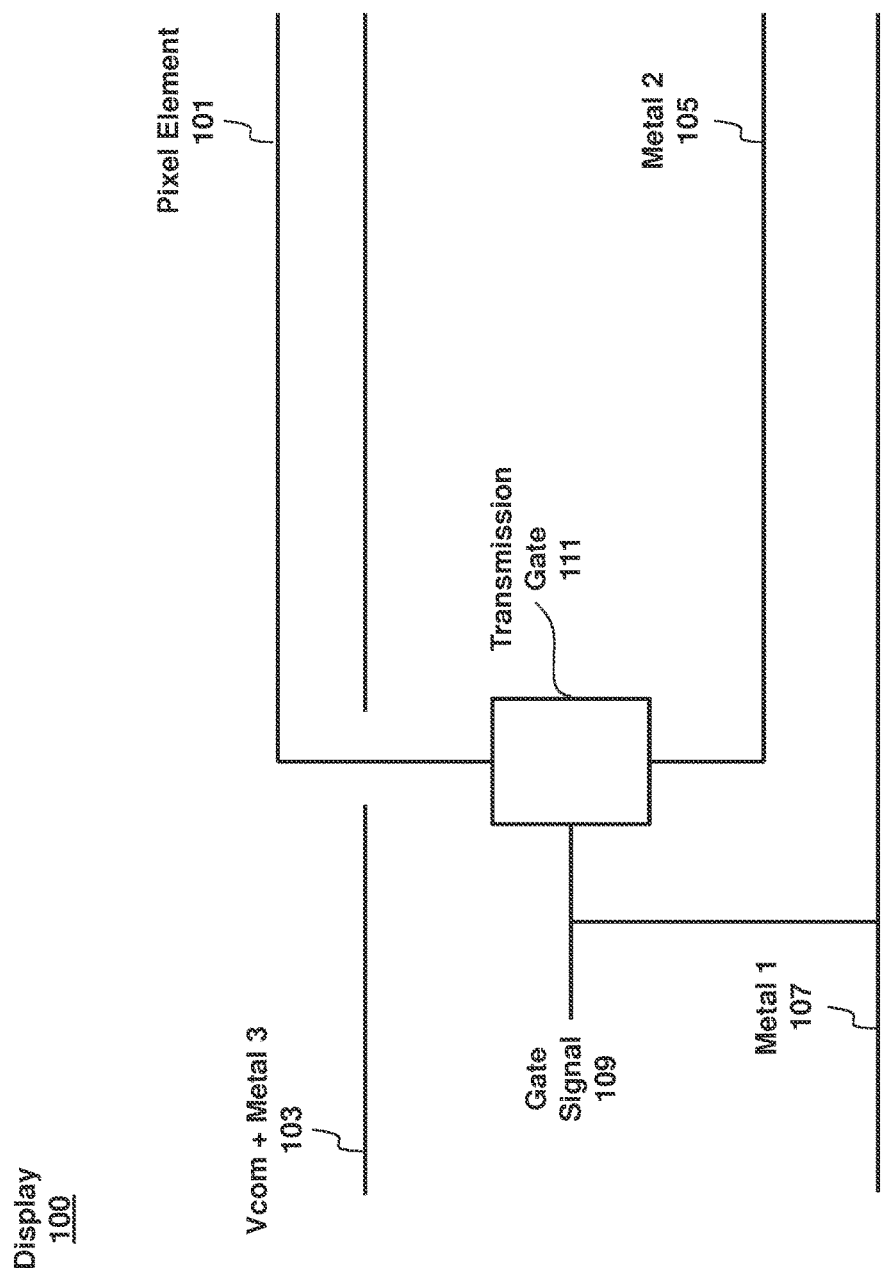
FIG. 1 illustrates a cross-sectional view of an exemplary integrated touch sensitive display according to various examples.

FIG. 1 illustrates a cross-sectional view of an exemplary integrated touch sensitive display 100 according to various examples. Touch sensitive display 100 can be integrated into a variety of touch sensitive devices, such as mobile phones, tablets, touchpads, portable or desktop computers, portable media players, or the like. Display 100 can include a stack of metal layers and pixel elements 101 as shown in FIG. 1. Pixel elements 101 can be operable to display one or more colors. For example, pixel element 101 can include red, green, and blue subpixels that can be selectively activated to produce a desired color.

Display 100 can further include a display driver (not shown) operable generate a data signal for controlling the operation of pixel element 101. The data signal can be sent to pixel element 101 via metal 2 layer (M2) 105 and transmission gate 111. Transmission gate can be coupled to receive a gate signal 109 from a gate driver (not shown) via metal 1 layer (M1) 107. Gate signal 109 can be used to select display pixels that are to receive display data from the gate driver by selectively opening and closing transmission gate 111.

Display 100 can further include Vcom and metal 3 layer (VCOM+M3) 103 for providing a supply voltage to various circuit elements within display 100. As will be discussed in greater detail below, VCOM+M3 103 can be patterned into touch electrodes that can be used to detect touch and hover events on or near display 100. VCOM+M3 103 can be further patterned to allow transmission gate 111 to be coupled to pixel element(s) 101 through VCOM+M3 103, as shown in FIG. 1.

Figure 2:
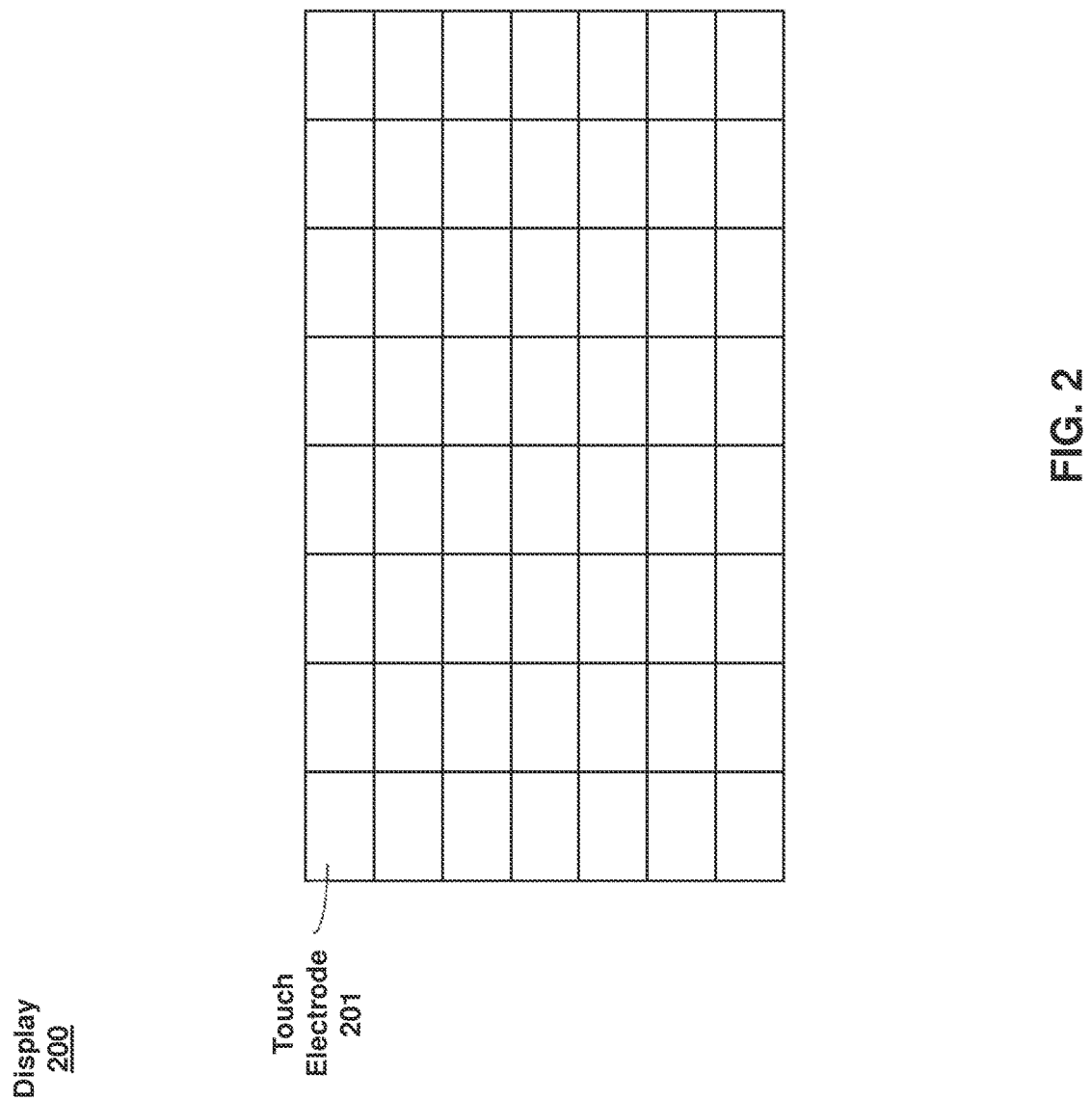
FIG. 2 illustrates a top view of an exemplary integrated touch sensitive display according to various examples.

FIG. 2 illustrates a top view of display 200 that can be used to detect touch events on a touch sensitive device, such as a mobile phone, tablet, touchpad, portable or desktop computer, portable media player, or the like. Display 200 can be similar or identical to display 100 and can include a single layer of multiple touch electrodes 201 that are arranged in a grid or other configuration. In some examples, touch electrodes 201 can be formed by patterning VCOM+M3 103 of display 100 into rectangular or other desired shapes. As will be discussed in greater detail below with respect to various examples, each touch electrode 201 can be driven with a stimulation signal and sense circuitry can be used to monitor changes in capacitance that can occur at each touch electrode 201. These changes can typically occur at a touch electrode 201 when an object (e.g., finger or passive stylus) is placed in close proximity to the touch electrode. Based on the monitored changes in capacitance, a location of a touch or hover event on or near display 200 can be determined.

Figure 3:
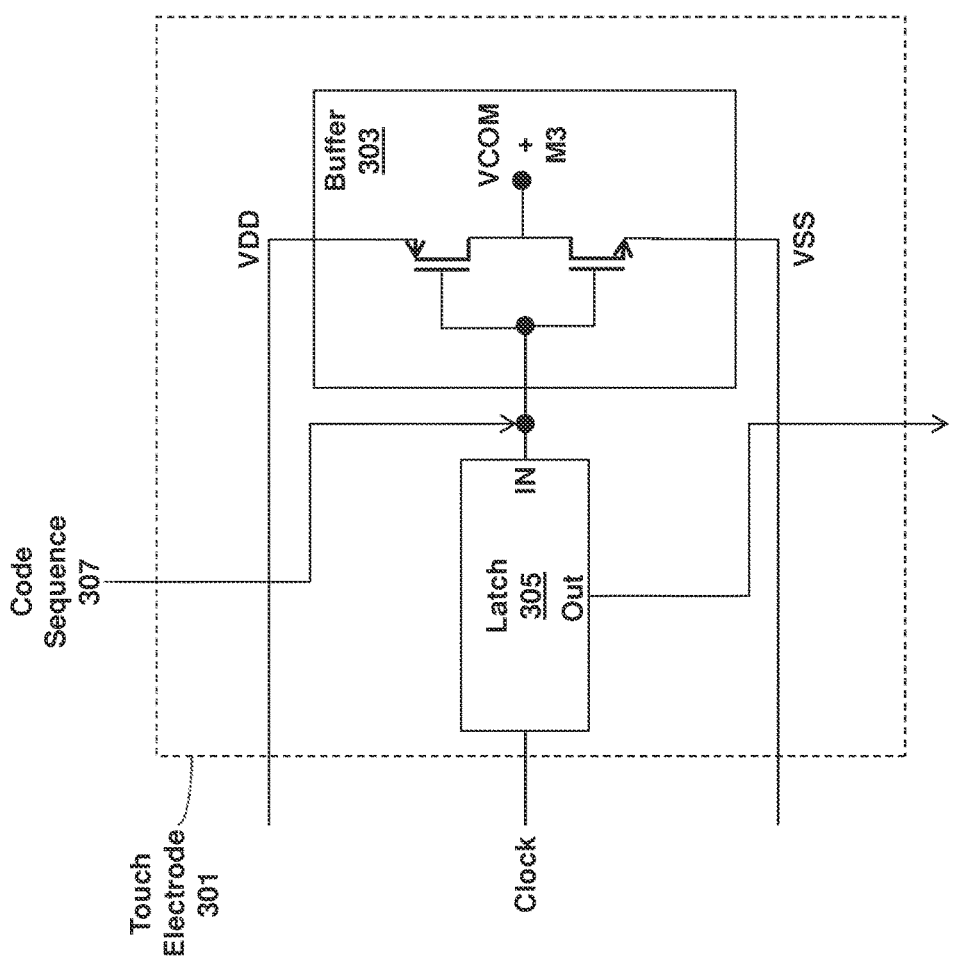
FIG. 3 illustrates a block diagram of an exemplary touch electrode that can be included within an integrated touch sensitive display according to various examples.

FIG. 3 illustrates a block diagram of an exemplary touch electrode 301 that can be used as touch electrode 201 of display 200 according to various examples. The body of touch electrode 301 can be formed by patterning VCOM+M3 103 of display 100 into a rectangular or other desired shape. As shown, touch electrode 301 can include buffer 303 coupled between voltage sources VDD and VSS. Buffer 303 can include an inverter coupled between the voltage sources VDD and VSS and having an output coupled to VCOM+M3 103 and an input coupled to receive code sequence 307. In this way, code sequence 307 can be used to selectively cause touch electrode 301 to be coupled to either VDD or VSS. For example, a high value (e.g., a voltage corresponding to a logic high) in code sequence 307 can cause the inverter of buffer 303 to couple voltage source VSS to touch electrode 301, while a low value (e.g., a voltage corresponding to a logic low) in code sequence 307 can cause the inverter of buffer 303 to coupled voltage source VDD to touch electrode 301.

Code sequence 307 can include any sequence of binary values that have a relatively low autocorrelation. For example, code sequence 307 can include a pseudo inverse code, Kasami code, or the like. Additionally, as described in greater detail below, code sequence 307 can be used as a modulation signal to uniquely modulate and demodulate each touch electrode 301 of display 400 and, as such, can have a length that is greater than or equal to the number of touch electrodes of display 400.

Touch electrode 301 can further include latch 305 coupled to receive a clock signal and code sequence 307 as inputs. Latch 305 can be operable to store and output the value of code sequence 307 at its input at a rising (or falling) edge of the clock signal.

Figure 4:
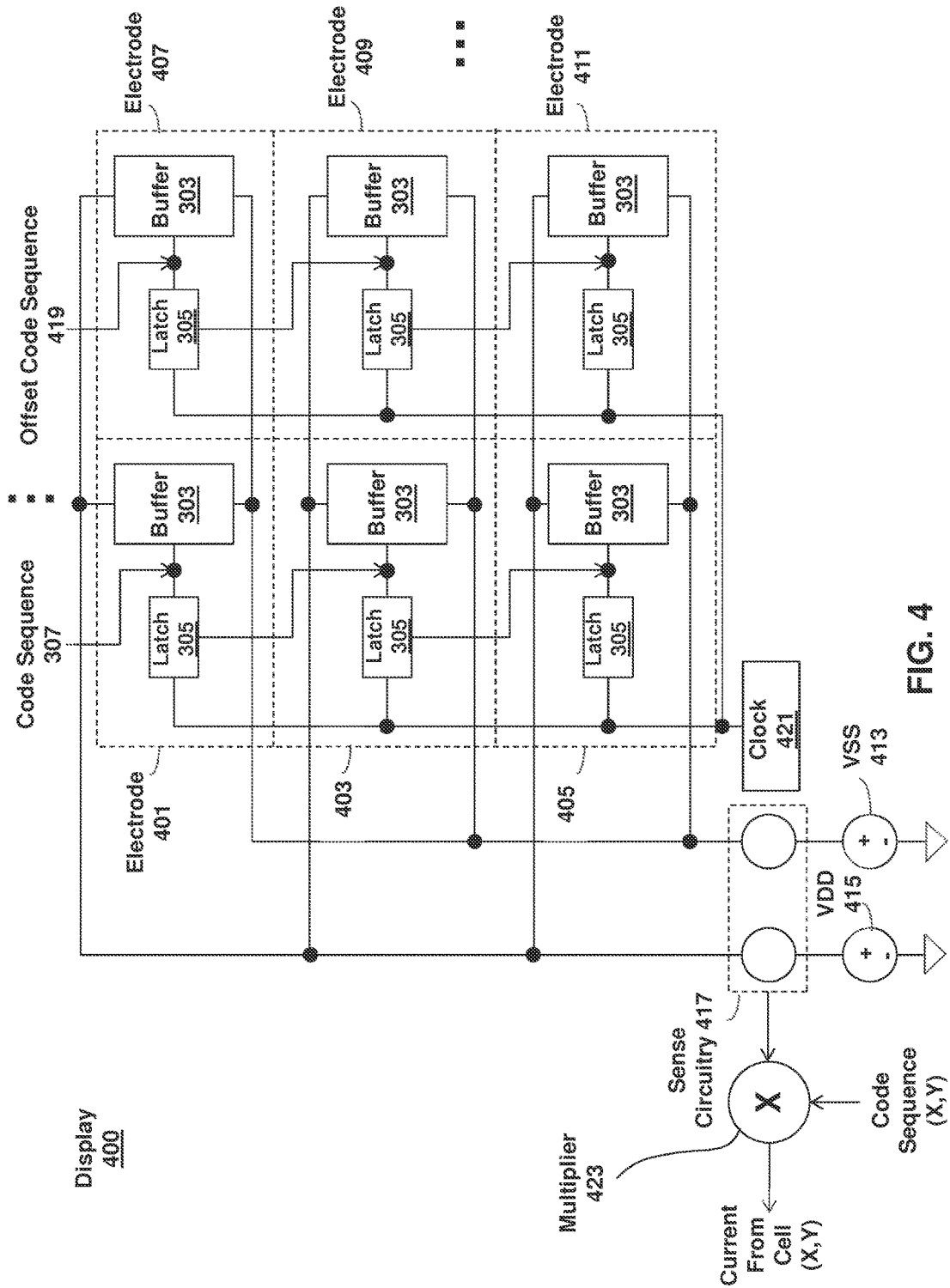
FIG. 4 illustrates a block diagram of a portion of an integrated touch sensitive display having the touch electrode of FIG. 3 according to various examples.

FIG. 4 illustrates a block diagram of a portion of display 400 according to various examples. Display 400 can be an implementation of display 200 made using touch electrodes 301 shown in FIG. 3. In the illustrated example, display 400 can include two columns and three rows of touch electrodes 401, 403, 405, 407, 409, and 411 that can be similar or identical to touch electrode 301. Each touch electrode of display 400 can include a latch 305 coupled to receive a clock signal from clock 421 and a buffer 303 coupled between voltages VSS and VDD provided by constant voltage sources VSS 413 and VDD 415.

As shown in FIG. 4, the touch electrodes in each column of display 400 can be coupled together in a cascaded fashion such that the input of latch 305 and buffer 303 of one touch electrode can be coupled to receive the output of latch 305 of an adjacent touch electrode. For example, buffer 303 and latch 305 of touch electrode 403 can be coupled to receive the output of latch 305 of touch electrode 401 as an input. Similarly, buffer 303 and latch 305 of touch electrode 405 can be coupled to receive the output of latch 305 of touch electrode 403 as an input. All touch electrodes in each column can be coupled together in a similar manner.

A touch electrode in each column of touch electrodes can be coupled to receive a code sequence. For example, touch electrode 401 in the first column of touch electrodes can be coupled to receive code sequence 307. This code sequence can be received as an input to both buffer 303 and latch 305 of touch electrode 401. In response to the received code sequence 307, buffer 303 can couple touch electrode 401 to either voltage VDD or VSS. Additionally, latch 305 store and output a value of code sequence 307 at each rising (or falling) edge of the clock signal received from clock 421. In this way, code sequence 307 can be provided to the first touch electrode in a column and can be propagated through each touch electrode in the column at each clock cycle. For example, in the first clock cycle, touch electrode 401 can receive the first bit of code sequence 307. At the second clock cycle, touch electrode 403 can receive the first bit of code sequence 307 while touch electrode 401 can receive the second bit of code sequence 307. This process can be repeated while touch detection is being performed. At the end of code sequence 307, the code can begin again at the first bit.

The code sequence received by each column of touch electrodes can include the same repeating sequence of values, but the sequence can be delayed by an amount to prevent any two touch electrodes from receiving the same portion of the sequence at the same time. For example, the first touch electrode 407 of the second column of touch electrodes can be coupled to receive offset code sequence 419. Offset code sequence 419 can include the same repeating code sequence of code sequence 307, but code sequence 419 can be delayed relative to code sequence 307. For example, in a touch sensor having two columns and three rows, the code sequence of code sequence 307 can include a total of six bits (e.g., bit 1, bit 2, bit 3, bit 4, bit 5, and bit 6). In this example, offset code sequence 419 can be delayed by three bits to prevent any bit from being received by two touch electrodes at the same time. For instance, as touch electrode 401 receives bit 1, touch electrode 407 can receive bit 4. During the next clock cycle, touch electrode 403 can receive bit 1, touch electrode 409 can receive bit 4, touch electrode 401 can receive bit 2, and touch electrode 407 can receive bit 5. In the following clock cycle, touch electrode 405 can receive bit 1, touch electrode 411 can receive bit 4, touch electrode 403 can receive bit 2, touch electrode 409 can receive bit 5, touch electrode 401 can receive bit 3, and touch electrode 407 can receive bit 6. This process can be repeated any number of times. In this way, each touch electrode can be uniquely modulated by being selectively coupled between voltages VSS and VDD according to its received code sequence.

As illustrated by this example, code sequence 307 can have a length that is greater than or equal to the number of touch electrodes in display 400 in order to uniquely modulate each touch electrode. Additionally, the minimum offset between code sequences applied to any two columns can be equal to the number of rows in the touch sensor. In other words, code sequence 307 can have a length greater than or equal to the total number of touch electrodes in display 400 and can be barrel shifted across all touch electrodes such that in time, each touch electrode can have a unique bit of code.

Display 400 can further include sense circuitry 417 coupled to voltage sources VSS 413 and VDD 415. Sense circuitry 417 can include current sensors operable to determine an amount of current drawn by the touch electrodes of display 400 from each voltage source. A current sense signal representing the difference between the sensed amount of current drawn from each voltage source can be output by sense circuitry 417. The current sense signal can be provided to demodulation circuitry that can be operable to demodulate the current sense signal using a code sequence for a particular electrode. For example, since the modulation of each touch electrode is known for a given time (e.g., the code sequence applied to the touch electrode), a multiplier 423 can be used to demodulate the current sense signal by multiplying the current sense signal by the code sequence for a particular touch electrode to determine the contribution of that touch electrode to the current sense signal. For example, to determine the current contribution of touch electrode at position (X, Y) (e.g., position (1, 2)) of display 400, the code being applied to the touch electrode at position (X, Y) (e.g., position (1, 2)) can be multiplied with the current sense signal from sense circuitry 417. The determined current from the touch electrode at position (X, Y) (e.g., position (1, 2)) can be representative of the capacitance at or near the touch electrode at position (X, Y) (e.g., position (1, 2)). This capacitance can be used to detect the location and amount of touch or hover events at or near the touch electrode. This process can be repeated for each touch electrode.

While the example shown in FIG. 4 includes two columns and three rows of touch electrodes, it should be appreciated that display 400 can include any number of rows and columns of touch electrodes. These additional rows and columns can be coupled together in a manner similar to that shown in FIG. 4. For example, the touch electrodes in each column can be coupled together in a cascaded fashion such that the latch output of one touch electrode is coupled to the input of the next touch electrode. Additionally, the code sequence applied to the columns of display 400 can have a length greater than or equal to the number of touch electrodes of display 400. The code sequence applied to each column can be offset by an amount that prevents any two touch electrodes of display 400 from receiving the same portion of the code segment. This can include offsetting the code segment by at least the number of rows in each column. However, larger offsets can be used if the length of the code sequence is greater than the number of touch electrodes in display 400. Additionally, while the touch electrodes are shown in FIG. 4 in a grid configuration, it should be appreciated that other configurations are also possible to form the desired touch region pattern. Moreover, while specific configurations have been described with reference to the rows and columns of display 400, it should be appreciated that the orientation of display 400 can be changed such that the described configurations for the rows and columns can be similarly applied to the columns and rows of display 400, respectively. Furthermore, while various examples describe a sensed touch, it should be appreciated that the display 400 can also sense a hovering object and generate hover signals therefrom.

Figure 5:
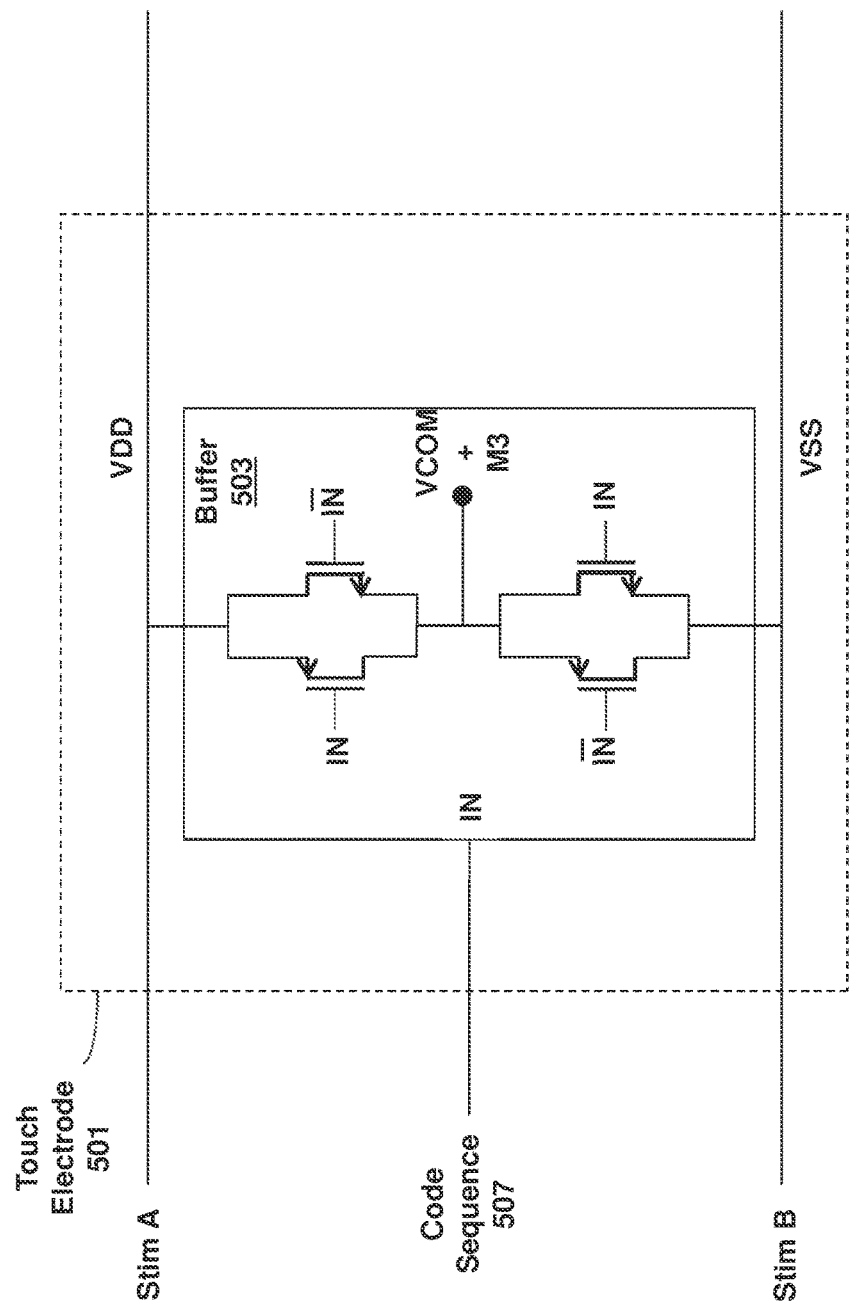
FIG. 5 illustrates a block diagram of another exemplary touch electrode that can be included within an integrated touch sensitive display according to various examples.

FIG. 5 illustrates a block diagram of an exemplary touch electrode 501 that can be used as touch electrode 201 of display 200 according to various examples. The body of touch electrode 501 can be formed by patterning VCOM+M3 103 of display 100 into a rectangular or other desired shape. As shown, touch electrode 501 can include buffer 503 coupled to receive code sequence 507 and stimulation signals Stim A, Stim B as inputs. Stimulation signals Stim A and Stim B can include any desired signal, such as a sinusoidal signal, square wave signal, or the like. Buffer 503 can include a transmission gate coupled between the stimulation signals Stim A and Stim B and can be operable to selectively allow one of the received stimulation signals to be transmitted to the output of the transmission gate, which can be coupled to VCOM+M3 103, in response to the code sequence 507 input. For example, a high value (e.g., a voltage corresponding to a logic high) in code sequence 507 can cause the transmission gate of buffer 503 to allow stimulation signal Stim B to be transmitted to touch electrode 501, while a low value (e.g., a voltage corresponding to a logic low) in code sequence 507 can cause the transmission gate of buffer 503 to allow stimulation signal Stim A to be transmitted to touch electrode 501. Similar to code sequence 307, code sequence 507 can include any sequence of binary values that has a relatively low autocorrelation. For example, code sequence 507 can include a pseudo inverse code, Kasami code, or the like. Additionally, as described in further detail below, code sequence 507 can be used to uniquely modulate and demodulate each touch electrode of each row of display 600 and, as such, can have a length that is greater than or equal to the number of touch electrodes in each row of display 600.

Figure 6:
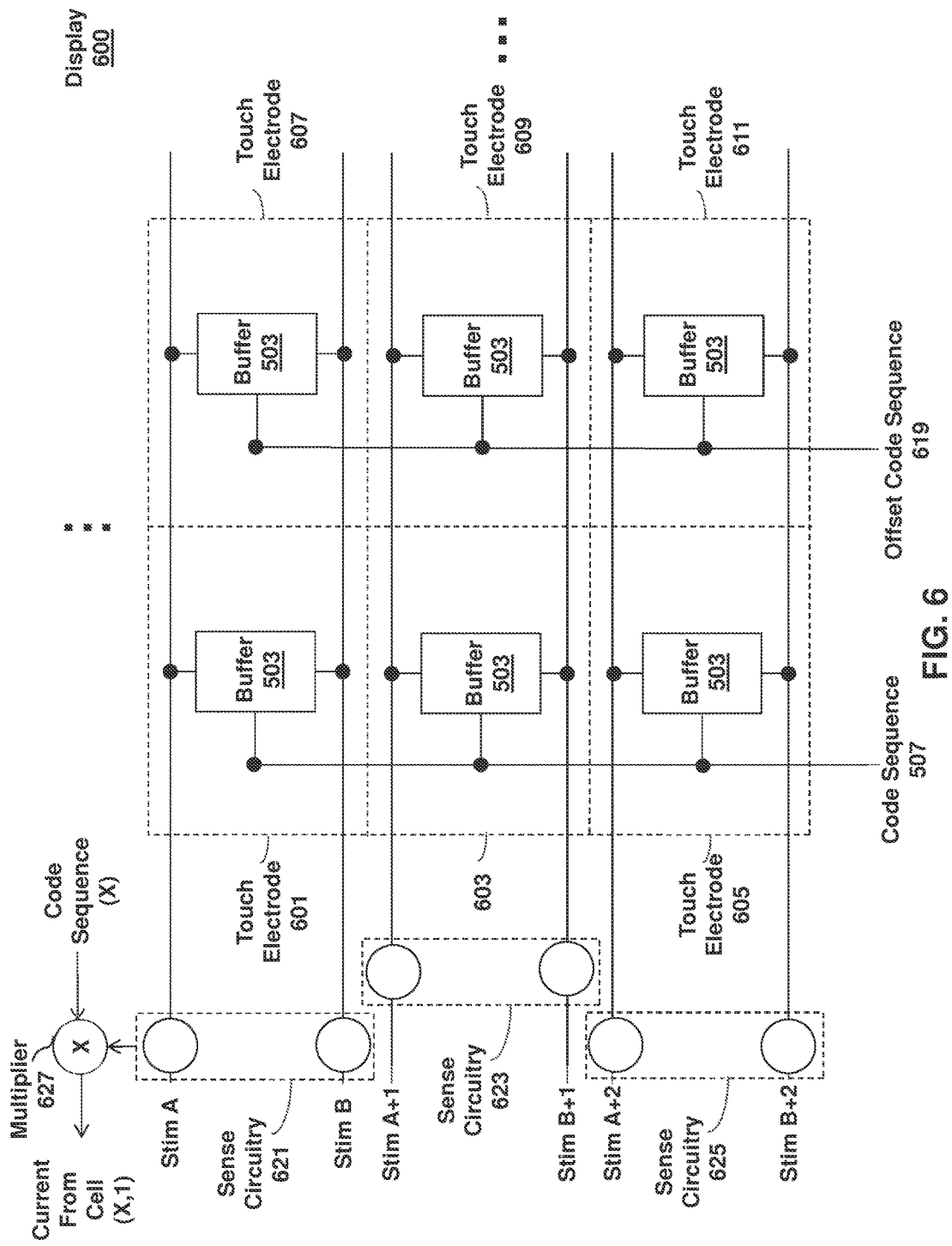
FIG. 6 illustrates a block diagram of a portion of an integrated touch sensitive display having the touch electrode of FIG. 5 according to various examples.

FIG. 6 illustrates a block diagram of a portion of display 600 according to various examples. Display 600 can be an implementation of display 200 made using touch electrodes 501 shown in FIG. 5. In the illustrated example, display 600 can include two columns and three rows of touch electrodes 601, 603, 605, 607, 609, and 611 that can be similar or identical to touch electrode 501. As shown, each touch electrode can include a buffer 503 coupled to receive a pair of stimulation signals and a code sequence. Touch electrodes in the same row can be coupled to receive the same pair of stimulation signals. For example, touch electrodes 601 and 607 in the first row can be coupled to receive stimulation signals Stim A and Stim B, while touch electrodes 603 and 609 in the second row can be coupled to receive a second set of stimulation signals Stim A+1 and Stim B+1. Similarly, touch electrodes 605 and 611 in the third row can be coupled to receive a third set of stimulation signals Stim A+2 and Stim B+2. In some examples, each pair of stimulation signals (e.g., Stim A and Stim B) can include the same signal, but the stimulation signals can be 180-degrees out of phase from each other. Additionally, stimulation signals from each pair of stimulation signals can have low cross correlation values. For example, stimulation signal Stim A can have low cross correlation with stimulation signals Stim A+1 and Stim A+2. Similarly, stimulation signal Stim B can have low cross correlation with stimulation signals Stim B+1 and Stim B+2.

Each touch electrode in the same column can be coupled to receive the same code sequence. For example touch electrodes 601, 603, and 605 in the first column can be coupled to receive code sequence 507, while touch electrodes 607, 609, and 611 in the second column can be coupled to receive offset code sequence 619. As mentioned above, code sequence 507 can include any sequence of binary values that have a relatively low autocorrelation. For example, code sequence 507 can include a pseudo inverse code, Kasami code, or the like. Offset code sequence 619 can include the same code sequence of code sequence 507, but can be offset by an amount that prevents any touch electrode in the same row of display 600 from receiving the same portion of the code at any time. For example, in a touch sensor having two columns with three rows each, the code sequence of code sequence 507 can have a total of two bits (e.g., bit 1 and bit 2). In this example, offset code sequence 619 can be delayed by 1 bit to prevent any bit being received by two touch electrodes in the same row at the same time. For instance, as touch electrodes 601, 603, and 605 receive bit 1, touch electrodes 607, 609, and 611 can receive bit 2. During the next clock cycle, touch electrodes 601, 603, and 605 can receive bit 2, while touch electrodes 607, 609, and 611 can receive bit 1. In this way, each touch electrode in a row can be uniquely modulated by selectively coupling it to either of a pair of stimulation signals (e.g., between stimulation signals Stim A and Stim B).

Display 600 can further include sense circuitry 621, 623, and 625 coupled between pairs of stimulation signals. Sense circuitry 621, 623, and 625 can each include current sensors operable to determine an amount of current drawn by the touch electrodes of display 600 from each stimulation signal source. A current sense signal representing the difference between the sensed amount of current drawn from each stimulation signal source can be output by each of sense circuitry 621, 623, and 625. The current sense signal can be provided to demodulation circuitry that can be operable to demodulate the current sense signal using a code sequence for a particular electrode. For example, since sense circuitry 621 is coupled to measure the current drawn by a known row of touch electrodes 601 and 607, and because the modulation for a particular touch electrode within the row the modulation of each touch electrode is known for a given time (e.g., the code sequence applied to the touch electrode), a multiplier 627 can be used to demodulate the current sense signal by multiplying the current sense signal by the code sequence for a particular touch electrode to determine the contribution of that touch electrode to the current sense signal. For example, to determine the current contribution of touch electrode at position (X) (e.g., position 2) of the first row of display 600, the code being applied to touch electrode 607 (e.g., offset code sequence 619) can be multiplied with the current sense signal from sense circuitry 621. The determined current from the touch electrode 607 can be representative of the capacitance at or near touch electrode 607. This capacitance can be used to detect the location and amount of touch or hover events at or near the touch electrode. While not shown, it should be appreciated that additional multipliers can be coupled to sense circuitry 623 and 625 to demodulate the current sense signals in a similar manner.

Using a configuration similar or identical to that of FIG. 6 allows the use of M stimulation signals and a code sequence having a length of N for a display having M rows and N columns of touch electrodes. This advantageously reduces the length of the code sequence (e.g., code sequence 505 and offset code sequence 619) needed, thereby reducing the integration time for the display. Additionally, the amount of circuitry located on each touch electrode can be reduced since a latch is no longer needed.

While the example shown in FIG. 6 includes two columns and three rows of touch electrodes, it should be appreciated that display 600 can include any number of rows and columns of touch electrodes. These additional rows and columns can be coupled together in a manner similar to that shown in FIG. 6. For example, the touch electrodes in each column can be coupled to receive the same code sequence, while touch electrodes in each row can be coupled to receive the same pair of stimulation signals. The code sequence applied to the columns of display 600 can have a length greater than or equal to the number of columns of display 600. Each pair of stimulation signals can include the same signal, but the stimulation signals can be 180-degrees out of phase from each other. Additionally, each pair of stimulation signals can have low cross correlation values with other pairs of stimulation signals. The code sequence applied to each column can be offset by an amount that prevents any two touch electrodes in the same row of display 600 from receiving the same portion of the code segment. This can include offsetting the code segment for each column by 1. However, other offsets can be used if the length of the code sequence is greater than the number of touch electrodes in each row of display 600. Additionally, while the touch electrodes are shown in FIG. 6 in a grid configuration, it should be appreciated that other configurations are also possible to form the desired touch region pattern. Moreover, while specific configurations have been described with reference to the rows and columns of display 600, it should be appreciated that the orientation of display 600 can be changed such that the described configurations for the rows and columns can be similarly applied to the columns and rows of display 600, respectively. Furthermore, while various examples describe a sensed touch, it should be appreciated that the display 600 can also sense a hovering object and generate hover signals therefrom.

Figure 7:
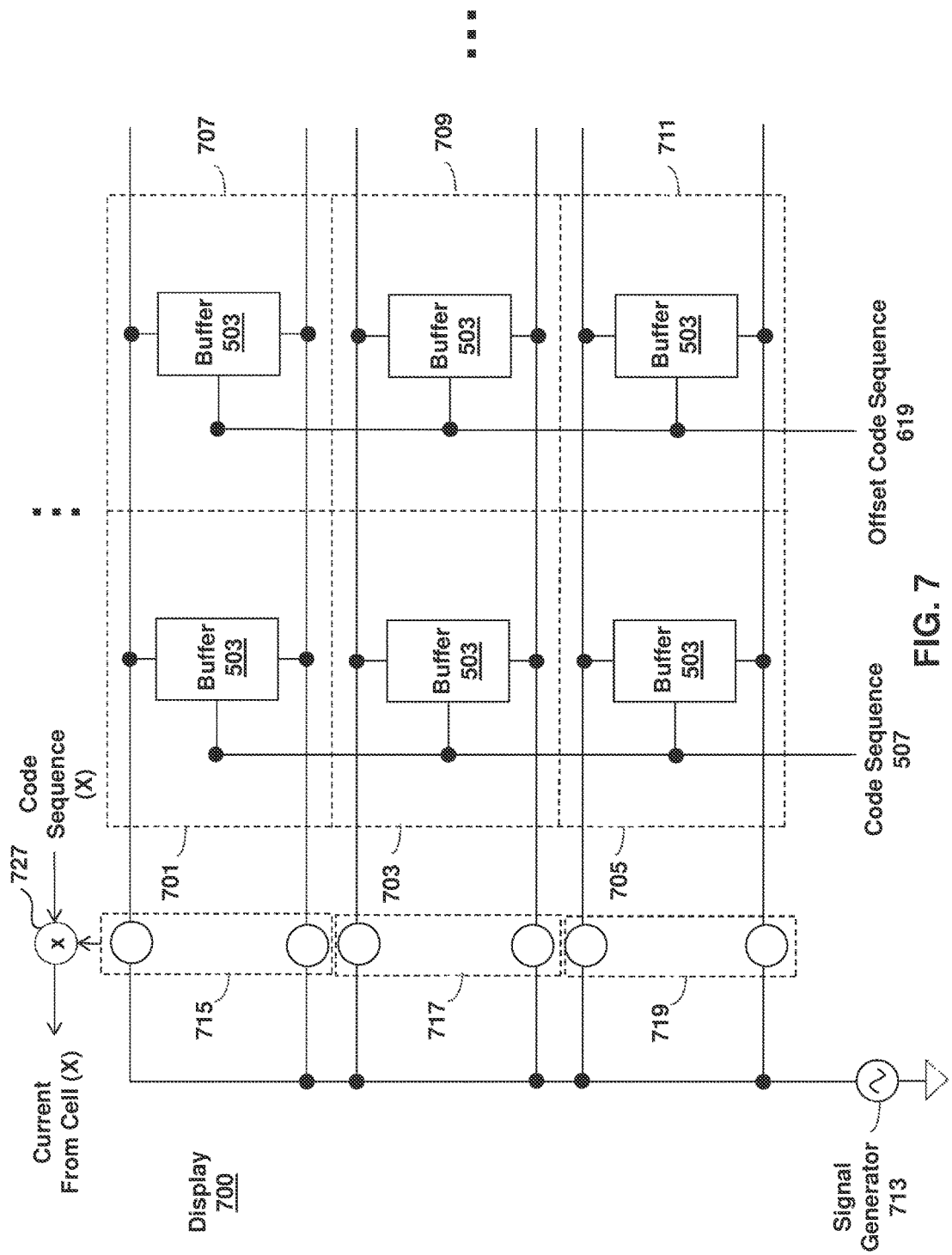
FIG. 7 illustrates a block diagram of a portion of another integrated touch sensitive display having the touch electrode of FIG. 5 according to various examples.

FIG. 7 illustrates a block diagram of a portion of display 700 according to various examples. Display 700 can be another implementation of display 200 made using touch electrodes 501 shown in FIG. 5. In the illustrated example, display 700 can include two columns and three rows of touch electrodes 701, 703, 705, 707, 709, and 711 that can be similar or identical to touch electrode 501. Similar to the display 600, each touch electrode can include a buffer 503 coupled to receive a pair of stimulation signals and a code sequence. However, unlike the implementation shown in FIG. 6, buffers 503 of display 700 can be coupled to receive the same stimulation signal input generated from stimulation signal generator 713. The stimulation signal generated by signal generator can be similar to the stimulation signals used in display 600. For example, the stimulation signal can include a sinusoidal or square wave signal. Since the same stimulation signal is applied to both inputs of each buffer 503 in each row, display 700 can include sense circuitry 715, 717, and 719 coupled to each pair of inputs of each row of display 700. In this way, the amount of current being drawn by each row of touch electrodes can be determined. Additionally, by globally applying the stimulation signal to all supply lines and electrodes of display 700 (e.g., Gate Line High, low voltage supplies, etc.), as well as the display back plane shielding, the level of undesired current sensed by sense circuitry 715, 717, and 719 can be reduced, thereby improving the dynamic range requirement of the analog front end circuitry.

Similar to display 600, each touch electrode in the same column can be coupled to receive the same code sequence. For example touch electrodes 701, 703, and 705 in the first column can be coupled to receive code sequence 507, while touch electrodes 707, 709, and 711 in the second column can be coupled to receive offset code sequence 619. Code sequence 507 and offset code sequence 619 can be similar or identical to those used in display 600. In this way, each touch electrode in a row can be selectively coupled it to either of stimulation signal inputs in a unique way.

By including sense circuitry for pair of stimulation inputs for each row of display 700 and by uniquely coding each column of touch electrodes, the capacitance of each touch electrode of display 700 can be determined. For example, a multiplier 727 can be coupled to receive a current sense signal representative of the difference between the sensed amount of current drawn from each stimulation signal source from sense circuitry 715. To determine the amount of current drawn by a particular touch electrode X in the row of touch electrodes coupled to sense circuitry 715, multiplier 727 can multiply the received current sense signal by the code sequence for column X. For example, to determine the current drawn by touch electrode 707 (the touch electrode in the second column), the sense signal from sense circuitry 715 can be multiplied by offset code sequence 619. The result can be a signal representative of the current from touch electrode 707. While not shown, it should be appreciated that additional multipliers can be included and coupled to receive current sense signals from each of the sense circuits.

While the example shown in FIG. 7 includes two columns and three rows of touch electrodes, it should be appreciated that display 700 can include any number of rows and columns of touch electrodes. These additional rows and columns can be coupled together in a manner similar to that shown in FIG. 7. For example, the touch electrodes in each column can be coupled to receive the same code sequence, while all touch electrodes in all rows can be coupled to receive the same stimulation signal. The code sequence applied to each column can be offset by an amount that prevents any two touch electrodes in the same row of display 700 from receiving the same portion of the code segment. This can include offsetting the code segment for each column by 1. However, other offsets can be used if the length of the code sequence is greater than the number of touch electrodes in each row of display 700. Additionally, while the touch electrodes are shown in FIG. 7 in a grid configuration, it should be appreciated that other configurations are also possible to form the desired touch region pattern. Moreover, while specific configurations have been described with reference to the rows and columns of display 700, it should be appreciated that the orientation of display 700 can be changed such that the described configurations for the rows and columns can be similarly applied to the columns and rows of display 700, respectively. Furthermore, while various examples describe a sensed touch, it should be appreciated that the display 700 can also sense a hovering object and generate hover signals therefrom.

In other examples, each of sense circuitry 715, 717, and 719 can be coupled to sense the current drawn by blocks of touch electrodes rather than rows or columns of electrodes. For example, sense circuitry 719 can instead be coupled to sense the current drawn by a first block of electrodes formed by touch electrodes 703, 705, 709, and 711 (or any other rectangular block of electrodes containing any number of electrodes), sense circuitry 717 can be coupled to sense the current drawn by a second block of electrodes formed by touch electrodes 701, 707, and the two electrodes located above touch electrodes 701 and 707 (not shown), and sense circuitry 715 can be coupled to sense the current drawn by a third block of electrodes (not shown).

Figure 8:
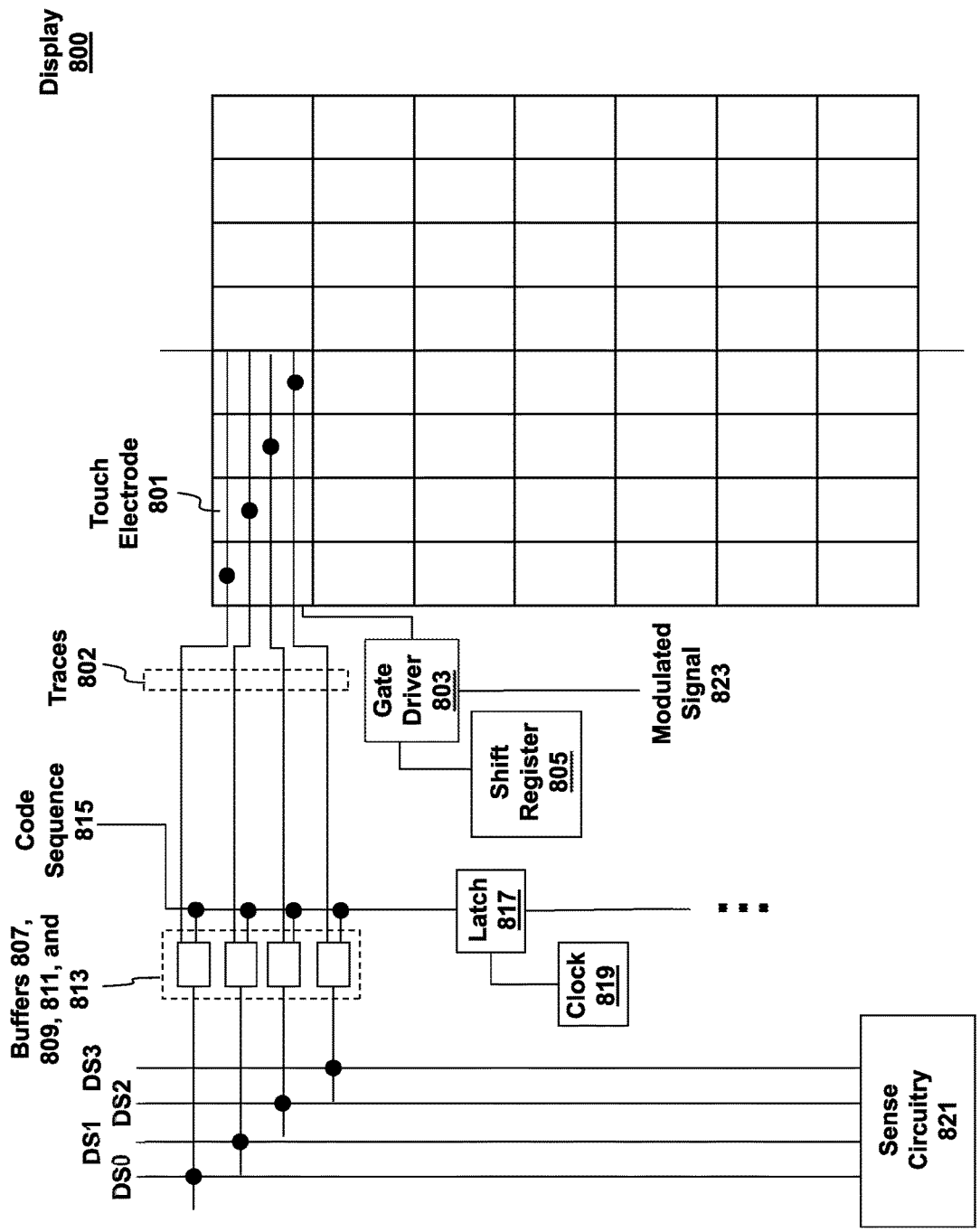
FIG. 8 illustrates a block diagram of a portion of an integrated touch sensitive display having circuitry separate from the touch electrodes according to various examples.

FIG. 8 illustrates a block diagram of a display 800 according to various examples. Display 800 can include rows and columns of touch electrodes 801, which can be formed by patterning VCOM+M3 03 of display 100 into rectangular or other desired shapes. Display 800 can further include buffers 807, 809, 811, and 813 coupled to touch electrodes 801 on the left half of the first row of touch electrodes by traces 802. In some examples, traces 802 can be formed by patterning the M1 107 of display 100 and can be coupled to VCOM+M3 103 of touch electrodes 801 by vias. Buffers 807, 809, 811, and 813 can each include a transmission gate for selectively coupling touch electrodes 801 to buses DS0-DS3. Display 800 can be coupled to receive code sequence 815 to control buffers 807, 809, 811, and 813 to selectively couple touch electrodes 801 to buses DS0-DS3. Code sequence 815 can have a length equal to the number of rows of display 800 and can be configured to cause only one row of touch electrodes 801 to be coupled to buses DS0-DS3 at the same time. For example, code sequence can have one high bit (e.g., corresponding to logic 1) followed by low bits (e.g., corresponding to logic 0) for a total number of bits equal to the number of rows of touch display 800.

Display 800 can further include latch 817 coupled to receive code sequence 815 and a clock signal from clock 819. Latch 817 can be operable to store and output the value at its input at a rising (or falling) edge of the clock signal.

Display 800 can further include shift register 805 and gate driver 803 coupled to receive an output of shift register 805 and modulated signal 823. In some examples, modulated signal 823 can include a modulated VGL and VGH bias voltages of display 800. Gate driver 803 can apply modulated signal 823 to each of the touch electrodes 801 in the left half of the top row of display 800. This can effectively bootstrap the majority of the undesired parasitic capacitances of display 800 and prevent sense circuitry 821 from being overloaded, thereby reducing the dynamic range requirement of the receiver front end circuitry.

While not shown, additional buffers, latches, shift registers, gate drivers, and traces can be included for each half of each row of display 800 and can be coupled to touch electrodes 801 in a manner similar to that shown for the left half of the first row of display 800. For example, four buffers can be coupled between buses DS0-DS3 and the touch electrodes 801 on the left half of the second row of display 800 by traces patterned into M1 107. An additional shift register can be included and can be coupled to an additional gate driver. The additional gate driver can also be coupled to receive modulated signal 817 and can be coupled to apply modulated signal 817 to each of the touch electrodes 801 on the left half of the second row of display 800. Similar circuitry can be included for the remaining rows on the left half of display 800. Additionally, similar circuitry can be included for each row on the right half of display 800 and additional buses DS4-DS7 (not shown) can be included for the right half of display 800.

Similar to the example shown in FIG. 4, the circuitry for each row of touch electrodes 801 can be coupled together in a cascaded fashion such that the code sequence received by the buffers and latch of one row can be received from the output of a latch from an adjacent row. For example, the circuitry for the left half of the second row of touch electrodes (not shown) can include four buffers and a latch coupled to receive the code sequence output of latch 817. The output of the second row's latch can similarly be provided to the buffers and latch of the circuitry for the left half of the third row of touch electrodes 801 and so on. In this way, code sequence 815 can be propagated through the circuitry associated with each row touch electrodes 801 to selectively couple and decouple each row of touch electrodes 801 from buses D0-D3.

Display 800 can further include sense circuitry 821 to perform self-capacitance measurements by measuring the current drawn by the touch electrodes 801 currently coupled to each of buses DS0-DS3. Since code sequence 815 can be configured to cause only one row of touch electrodes 801 to be coupled to buses DS0-DS3 at any time, sense circuitry 821 can simply measure the current drawn on each bus to measure the current drawn by a particular touch electrode 801 in a particular row. For example, during a first clock cycle, buffers 807, 809, 811, and 813 can couple the touch electrodes 801 in the first row of display 800 to buses DS0-DS3 and sense circuitry 821. During this clock cycle, all other touch electrodes 801 can be uncoupled from buses DS0-DS3. Sense circuitry 821 can then measure the current drawn from each bus to determine the capacitance at each touch electrode 801 in the row (e.g., the current drawn from bus DS0 corresponds to the capacitance of the touch electrode 801 in the first row and the first column). At a second clock cycle, buffers 807, 809, 811, and 813 can uncouple the touch electrodes 801 in the first row from buses DS0-DS3. In this clock cycle, buffers associated with the second row of touch electrodes 801 can couple the second row of touch electrodes 801 to buses DS0-DS3 while all other touch electrodes are uncoupled from buses DS0-DS3. Sense circuitry 821 can then measure the current drawn from each bus to determine the capacitance at each touch electrode 801 in the second row (e.g., the current drawn from bus DS3 corresponds to the capacitance of the touch electrode 801 in the second row and the fourth column). This process can be repeated for each row of display 800.

Using a configuration similar or identical to that shown in FIG. 8 advantageously reduces the circuitry located within each touch electrode. For example, no buffers, latches, or other circuitry is located on touch electrodes 801.

While display 800 is shown having one bus for each touch electrode 801 on each half row, it should be appreciated that a greater number of buses can be included. For example, eight buses can be included on the left side of display 800 and can be coupled to touch electrodes 801 on the left side of the first two rows. In this example, latch 817 can be omitted and a single latch can be placed between the circuitry for the second and third rows. This advantageously shortens the code sequence 815 needed to modulate display 800 (e.g., the minimum length of code sequence 815 can be (number of rows)/2), thereby reducing the integration time for touch/hover detection. However, a greater amount of space on the side of display 800 can be needed for the additional buses. Other numbers of buses, up to the number of touch electrodes 801 in each half of display 800, can be used.

Figure 9:
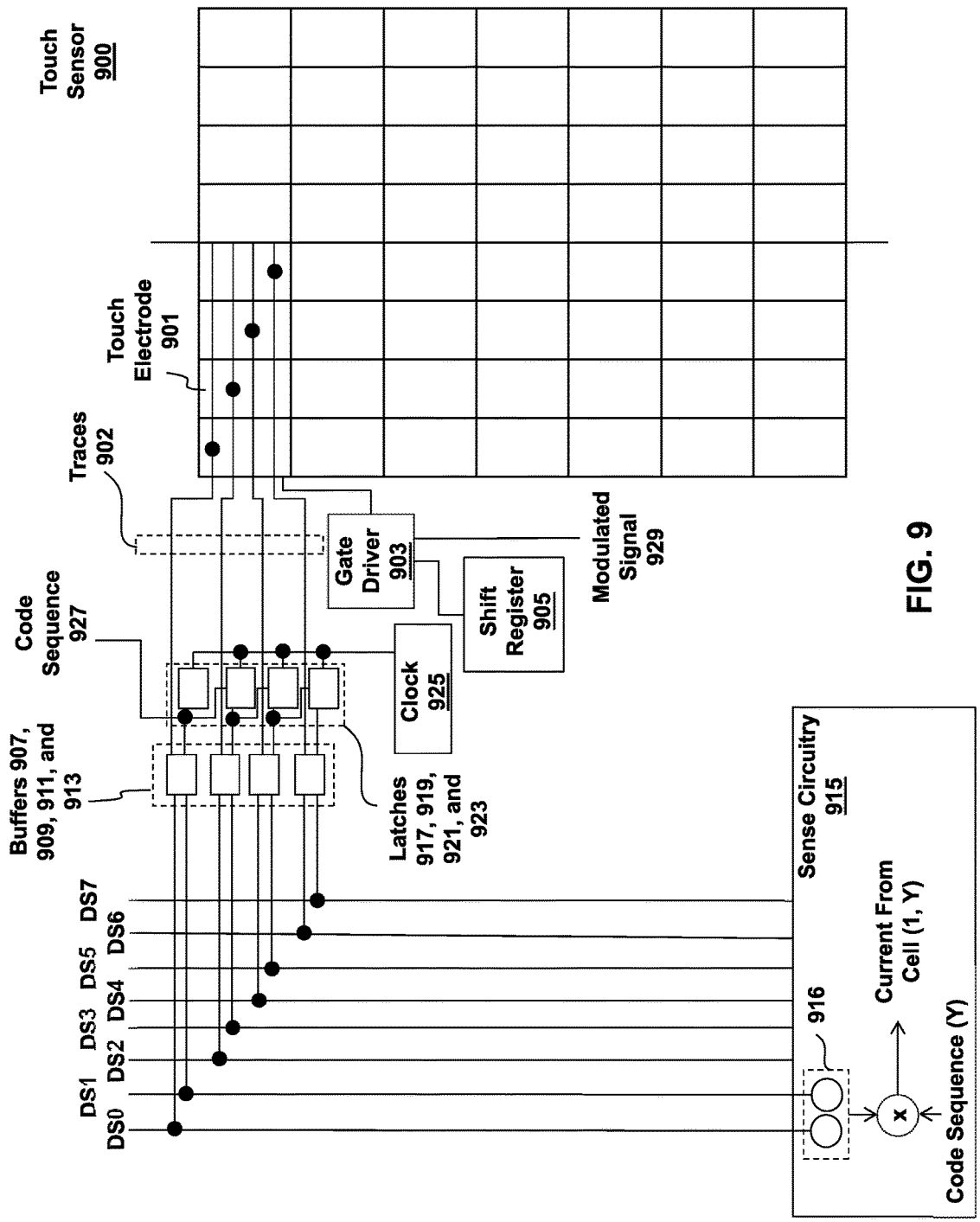
FIG. 9 illustrates a block diagram of a portion of another integrated touch sensitive display having circuitry separate from the touch electrodes according to various examples.

FIG. 9 illustrates a block diagram of a display 900 according to various examples. Display 900 can include rows and columns of touch electrodes 901, which can be formed by patterning VCOM+M3 103 of display 100 into rectangular or other desired shapes. Display 900 can further include buffers 907, 909, 911, and 913 coupled to touch electrodes 901 on the left half of the first row of touch electrodes by traces 902. In some examples, traces 902 can be formed by patterning the M1 107 of display 100 and can be coupled to VCOM+M3 103 of touch electrodes 901 by vias. Buffers 907, 909, 911, and 913 can each include a transmission gate similar or identical to that of buffer 503, described above.

Display 900 can further include latches 917, 919, 921, and 923 coupled to receive a clock signal from clock 925 and coupled together in a cascaded fashion such that the input of one latch is coupled to the output of another. Latches 917, 919, 921, and 923 can be operable to store and output the value at its input at a rising (or falling) edge of the clock signal. Additionally, the input to each latch can be coupled to control one of buffers 907, 909, 911, and 913 to selectively couple touch electrodes 901 to one of a pair of buses (e.g., couple touch electrode 901 in the first row and first column between buses DS0 and DS1). A first latch can be coupled to receive code sequence 927. In this way, code sequence 927 can be provided to the first buffer and can be propagated through each buffer for each row at each clock cycle. For example, in the first clock cycle, touch buffer 909 can receive the first bit of code sequence 927. At the second clock cycle, buffer 911 can receive the first bit of code sequence 927 while buffer 907 can receive the second bit of code sequence 927. This process can be continuously repeated while touch detection is being performed. At the end of code sequence 927, the code can begin again at the first bit.

Similar to code sequence 307, code sequence 927 can include any sequence of binary values that has a relatively low autocorrelation. For example, code sequence 927 can include a pseudo inverse code, Kasami code, or the like. Additionally, as described in further detail below, code sequence 927 can be used to uniquely modulate and demodulate each touch electrode of each row of display 900 and, as such, can have a length that is greater than or equal to the number of touch electrodes in each row of display 900.

Display 900 can further include shift register 905 and gate driver 903 coupled to receive an output of shift register 905 and modulated signal 917. In some examples, modulated signal 917 can include a modulated VGL and VGH bias voltages of display 900. Gate driver 903 can apply modulated signal 917 to each of the touch electrodes 901 in the left half of the top row of display 900.

Display 900 can further include shift register 905 and gate driver 903 coupled to receive an output of shift register 905 and modulated signal 929. In some examples, modulated signal 929 can include a modulated VGL and VGH bias voltages of display 900. Gate driver 903 can apply modulated signal 929 to each of the touch electrodes 901 in the left half of the top row of display 900.

While not shown, additional buffers, latches, shift registers, gate drivers, and traces can be included for each half of each row of display 900 that can be coupled to touch electrodes 901 in a manner similar to that shown for the left half of the first row of display 900. For example, four buffers can be coupled between buses DS0-DS7 and the touch electrodes 901 on the left half of the second row of display 900 by traces patterned into M1 107. Four additional cascaded latches can also be coupled to the additional buffers. The additional buffers and additional latches can be coupled to receive the code sequence output by latch 923. An additional shift register can be included and can be coupled to an additional gate driver. The additional gate driver can also be coupled to receive modulated signal 929 and can be coupled to apply modulated signal 929 to each of the touch electrodes 901 on the left half of the second row of display 900. Similar circuitry can be included for the remaining rows on the left half of display 900 and can be coupled together in a cascaded fashion as described above. Similar circuitry can also be included for each row on the right half of display 900 and additional buses DS8-DS15 (not shown) can be included for the right half of display 900.

Similar to display 800, the circuitry for each row of touch electrodes 901 can be coupled together in a cascaded fashion such that the code sequence received by the buffers and latch of one row can be received from the output of the last latch from an adjacent row. For example, the circuitry for the left half of the second row of touch electrodes (not shown) can include four buffers and four latches coupled to receive the code sequence output. The output of the second row's last latch can similarly be provided to the buffers and latches of the circuitry for the left half of the third row of touch electrodes 901 and so on. In this way, code sequence 927 can be propagated through the circuitry associated with each row touch electrodes 901 to selectively modulate each touch electrode 901 of display 900.

Display 900 can include sense circuitry 915 coupled to buses DS0-DS7. Sense circuitry 915 can include current sensors operable to determine an amount of current drawn by the touch electrodes of display 900 from each bus. A current sense signal representing the difference between the sensed amount of current drawn from each pair of buses can be output by the current sensors (e.g., current sensor 916). The current sense signal can be provided to demodulation circuitry that can be operable to demodulate the current sense signal using a code sequence for a particular electrode. For example, since sense circuitry 916 is coupled to measure the current drawn by a known row of touch electrodes (the first row), and since the modulation of each touch electrode within the row is known for a given time (e.g., the code sequence applied to the touch electrode), a multiplier can be used to demodulate the current sense signal by multiplying the current sense signal by the code sequence for a particular touch electrode to determine the contribution of that touch electrode to the current sense signal. For example, to determine the current contribution of touch electrode at position (X) (e.g., position 2) of the first row of display 900, the code being applied to the second touch electrode of row one can be multiplied with the current sense signal from sense circuitry 916. The determined current from the touch electrode can be representative of the capacitance at or near the touch electrode. This capacitance can be used to detect the location and amount of touch or hover events at or near the touch electrode. While not shown, it should be appreciated that additional current sensors and multipliers can be coupled to buses DS2-DS7 to demodulate the current sense signals in a similar manner.

While display 900 is shown having one pair of buses for each touch electrode 901 on each half row, it should be appreciated that a greater number of buses can be included. For example, 16 buses can be included on the left side of display 900 and can be coupled to touch electrodes 901 on the left side of the first two rows.

Figure 10A:
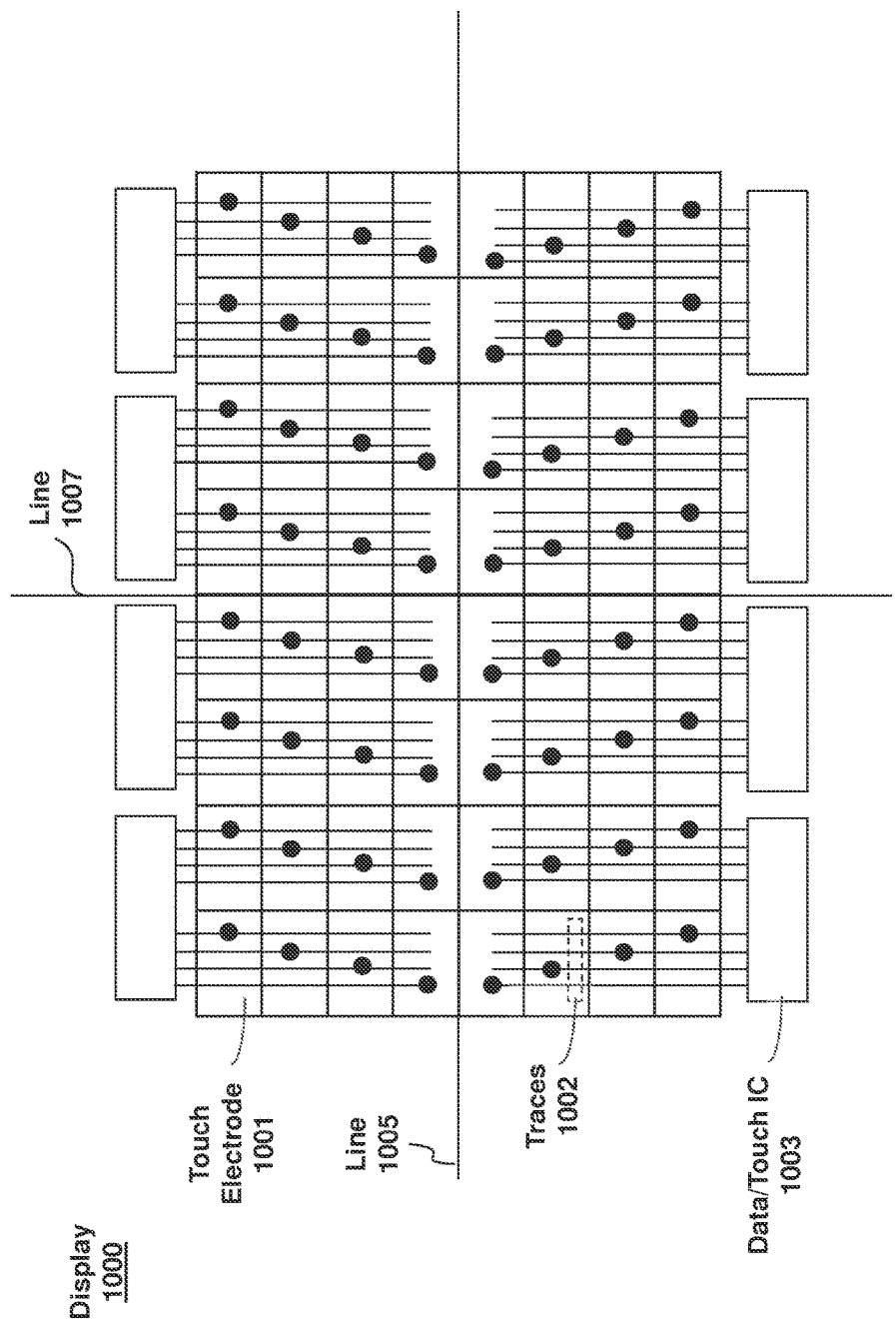
FIG. 10A illustrates a block diagram of a portion of an integrated touch sensitive display having combined display data and touch detection integrated circuits (ICs) according to various examples.

FIG. 10A illustrates a block diagram of display 1000 according to various examples. Display 1000 can be an implementation of display 200 made using combined display data and touch detection ICs 1003. Display 1000 can include rows and columns of touch electrodes 1001, which can be formed by patterning VCOM+M3 103 of display 100 into rectangular or other desired shapes. Display 1000 can further include combined display data and touch detection ICs 1003 coupled to touch electrodes 1001 by traces 1002. In some examples, traces 1002 can be formed by patterning the M1 107 of display 100 and can be coupled to VCOM+ M3 103 of touch electrodes 1001 by vias.

Figure 10B:
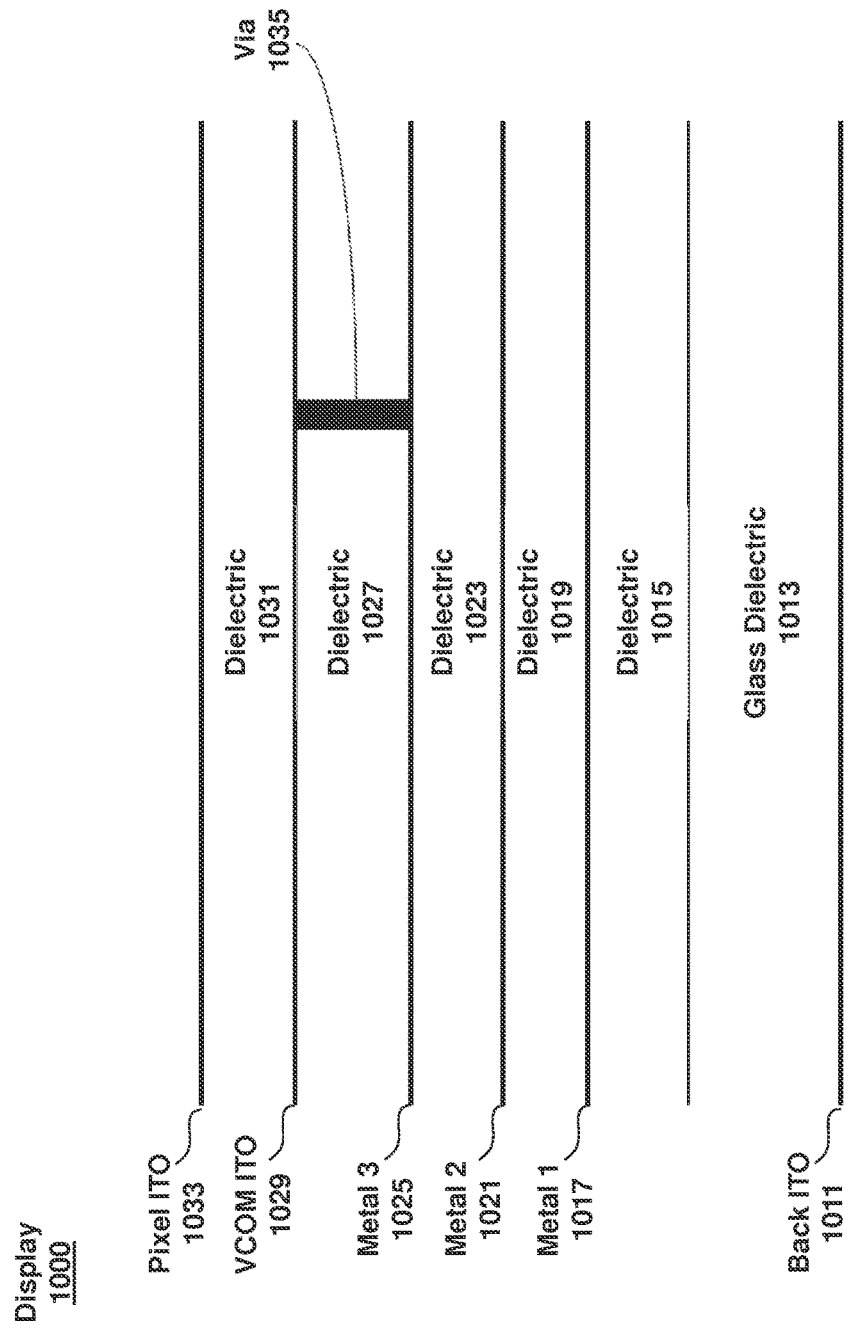
FIG. 10B illustrates an exemplary stackup of the integrated touch sensitive display of FIG. 10A according to various examples.

In other examples, as shown in FIG. 10B, the stackup of display 1000 can include a back ITO layer 1011, glass dielectric 1013, dielectric 1015, metal 1 layer 1017, dielectric 1019, metal 2 layer 1021, dielectric 1023, metal 3 layer 1025, dielectric 1027, VCOM ITO layer 1029, dielectric 1031, pixel ITO layer 1033, and via 1035. In these examples, touch electrodes 1001 of display 1000 can be formed by patterning VCOM ITO layer 1029, metal 3 layer 1025 can be separated from VCOM ITO layer by dielectric 1027, and each electrode formed from VCOM ITO layer 1029 pixel can be coupled to metal 3 layer 1025 by a via 1035.

Referring back to FIG. 10A, display 1000 can include a touch sensor similar to touch sensors 800 and 900, except that combined display data and touch detection ICs 1003 can be used to perform the functions of the circuitries attached to each row of displays 800 or 900. For instance, in some examples, data/touch IC 1003 can be used to perform the gate driving functions of gate driver 803 and shift register 805, the modulating function of clock 819, latch 817, and buffers 807/809/811/813, and the touch/hover detection of sense circuitry 821. Similarly, in other examples, data/touch IC 1003 can be used to perform the gate driving functions of gate driver 903 and shift register 905; the modulating function of clock 925, latches 917/919/921/923, and buffers 907/909/911/913; and the touch/hover detection of sense circuitry 915.

In some examples, display 1000 can be separated into two halves across line 1005. In these examples, data/touch ICs 1003 on one half of the display can be configured to update its associated half of the display while data/touch ICs 1003 on the other half of the display can be configured to perform touch detection on its associated half. Data/touch ICs 1003 can be configured to repeatedly switch between display updating and touch detection. For example, the data/touch ICs 1003 on the top half of the display 1000 can update the display for 8 ms while the data/touch ICs 1003 on the bottom half of the display 1000 can perform touch detection. After the 8 ms, the data/touch ICs 1003 on the top half of the display 1000 can perform touch detection for 8 ms while the data/touch ICs 1003 on the bottom half of the display 1000 can update the display. This process can be repeated to simultaneously update the display and perform touch detection. In other examples, both halves of display 1000 can be updated during the same 8 ms (or other amount) segment of time. This can be done through the use of two active gate lines—one for the top half of display 1000 and one for the bottom half of display 1000, where each half of display 1000 has independent display data lines and sources. Once the display is updated, touch sensing can be performed for both halves of display 1000 during the next 8 ms (or other amount) segment of time.

In other examples, display 1000 can be further separated into smaller sections. For example, display 1000 can be separated into four sections as defined by lines 1005 and 1007. In these examples, data/source ICs 1003 for half of the sections can be configured to update the display while the remaining data/source ICs 1003 can be configured to perform touch detection. The data/source ICs 1003 can be further configured to switch between touch detection and updating the display as discussed above. It should be appreciated that display 1000 can be separated into any desired number of sections.

Figure 11:
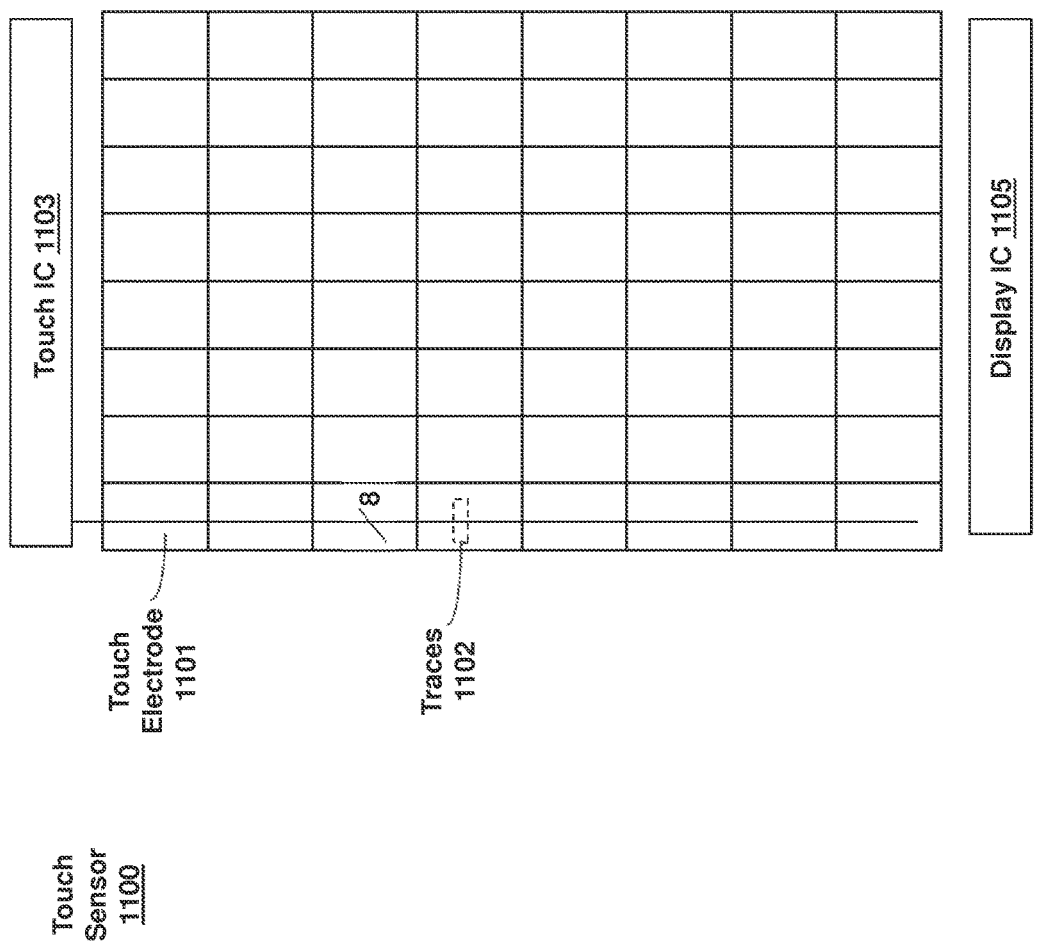
FIG. 11 illustrates a block diagram of a portion of another integrated touch sensitive display having separate display data and touch detection ICs according to various examples.

FIG. 11 illustrates a block diagram of another touch sensitive display 1100 according to various examples. Display 1100 can be an implementation of display 200 made using separate display data IC 1105 and touch detection IC 1003. Display 1100 can include rows and columns of touch electrodes 1101, which can be formed by patterning VCOM+M3 103 of display 1100 into rectangular or other desired shapes. Display 1100 can further include touch IC 1103 coupled to touch electrodes 1101 by traces 1102. In some examples, traces 1102 can be formed by patterning the M1 107 of display 100 and can be coupled to VCOM+M3 103 of touch electrodes 1101 by vias. One set of eight traces 1102 has been shown in FIG. 11 coupling touch electrodes 1101 to touch IC 1103. However, it should be appreciated that additional sets of eight traces can be included for each column of touch electrodes 1101 and that they have been omitted from FIG. 11 to avoid cluttering the figure. Display 1100 can further include display IC 1105 for updating the display.

Display 1100 can include a touch sensor similar to touch sensors 800 and 900, except that touch IC 1103 and display IC 1105 can be used to perform the functions of the circuitries attached to each row in either display 800 or 900. For instance, in some examples, touch IC 1103 can be used to perform the modulating function of clock 819, latch 817, and buffers 807/809/811/813, and the touch/hover detection of sense circuitry 821. Additionally, display IC 1105 can be used to perform the gate driving functions of gate driver 803 and shift register 805. Similarly, in other examples, touch IC 1103 can be used to perform the modulating function of clock 925, latches 917/919/921/923, and buffers 907/909/911/913; and the touch/hover detection of sense circuitry 915. Additionally, display IC 1105 can be used to perform the gate driving functions of gate driver 903 and shift register 905.

Using a configuration similar or identical to that shown in FIG. 11, the amount of space on the sides of display 1100 can be reduced. This can be beneficial when display 1100 is included in devices with smaller form factors that need smaller widths.

One or more of the functions relating to the operation of an integrated touch sensitive display described above can be performed by a system similar or identical to system 1200 shown in FIG. 12. System 1200 can include instructions stored in a non-transitory computer readable storage medium, such as memory 1203 or storage device 1201, and executed by processor 1205. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the system is not limited to the components and configuration of FIG. 12, but can include other or additional components in multiple configurations according to various examples. Additionally, the components of system 1200 can be included within a single device, or can be distributed between multiple devices.

Figure 14:
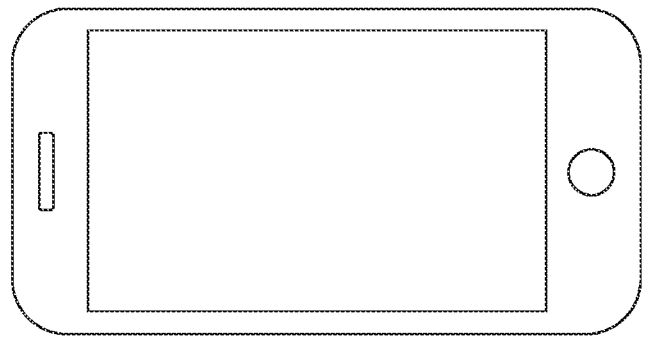
FIGS. 13-16 illustrate exemplary personal devices that can include an integrated touch sensitive display s according to various examples.
Figure 13:
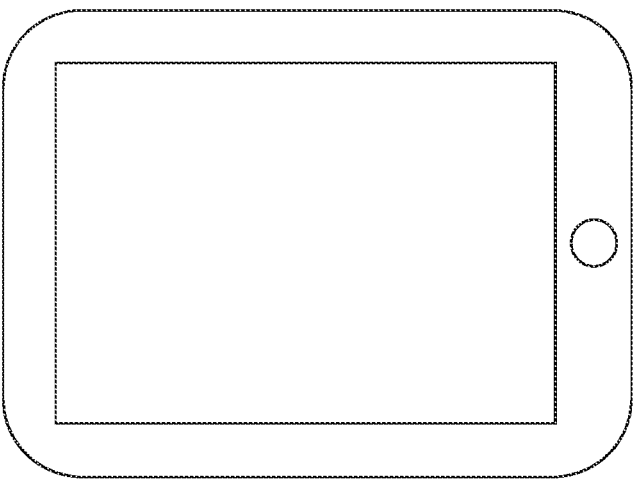
Figure 16:
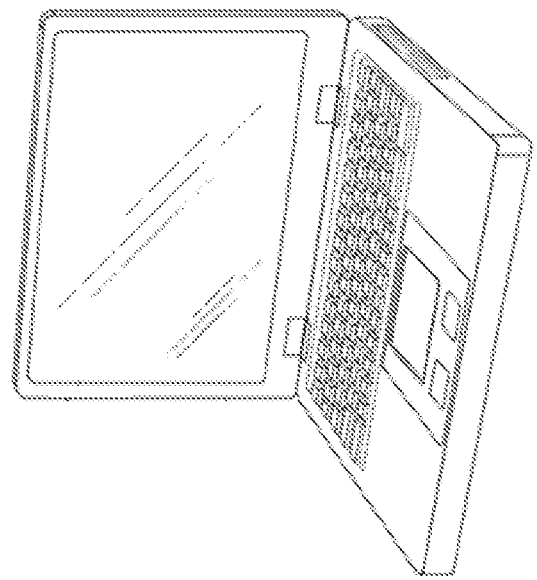
Figure 15:
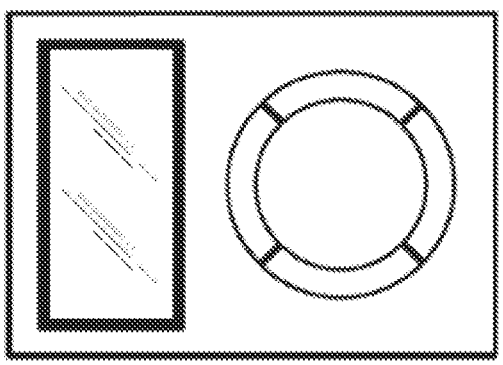

FIGS. 13-16 show example systems in which an integrated touch sensitive display according to examples of the disclosure may be implemented. FIG. 13 illustrates an exemplary personal device 1300, such as a tablet, that can be used with a an integrated touch sensitive display according to various examples. FIG. 14 illustrates another exemplary personal device 1400, such as a mobile phone, that can be used with an integrated touch sensitive display according to various examples. FIG. 15 illustrates yet another exemplary personal device 1500, such as a portable media player, that can be used with an integrated touch sensitive display according to various examples. FIG. 16 illustrates another exemplary personal device 1600, such as a laptop computer, that can be used with an integrated touch sensitive display according to various examples.

Therefore, according to the above, some examples of the disclosure are directed to an integrated touch sensitive display comprising: a first voltage source; a second voltage source; a plurality of touch electrodes, wherein each of the plurality of touch electrodes comprises an inverter operable to couple an associated touch electrode to either the first voltage source or the second voltage source based on a code sequence signal, and wherein each of the plurality of touch electrodes is coupled to receive a different code sequence signal; and sense circuitry operable to generate a current sense signal based on a difference between a first current through the first voltage source and a second current through the second voltage source. Additionally or alternatively to one or more of the examples disclosed above, in some examples, the display can further include demodulation circuitry operable to demodulate the current sense signal to determine a capacitance at a touch electrode of the plurality of touch electrodes based on a code sequence signal received by the touch electrode of the plurality of touch electrodes. Additionally or alternatively to one or more of the examples disclosed above, in some examples, the code sequence signals received by each of the plurality of touch electrodes comprise the same sequence of values, and wherein each of the code sequence signals received by the plurality of touch electrodes has a different phase offset. Additionally or alternatively to one or more of the examples disclosed above, in some examples, the code sequence signals received by the plurality of touch electrodes each comprise a pseudo inverse code or a Kasami code. Additionally or alternatively to one or more of the examples disclosed above, in some examples, a length each of the code sequence signals received by the plurality of touch electrodes is greater than or equal to a number of touch electrodes in the plurality of touch electrodes. Additionally or alternatively to one or more of the examples disclosed above, in some examples, each of the plurality of touch electrodes further comprises a latch coupled to receive a code sequence signal associated with the touch electrode. Additionally or alternatively to one or more of the examples disclosed above, in some examples, the touch electrodes are arranged in rows and columns, and wherein latches of touch electrodes in the same column are coupled in series.

Some examples of the disclosure are directed to an integrated display touch screen comprising: a plurality of touch electrodes arranged in rows and columns, each touch electrode comprising a transmission gate formed thereon, wherein: transmission gates of touch electrodes in the same row are operable to couple their associated touch electrode to receive either a first stimulation signal from a first bus of the row or a second stimulation signal from a second bus of the row based on a code sequence signal, transmission gates of touch electrodes in the same column are coupled to receive the same code sequence signal; and transmission gates of touch electrodes in each row are coupled to receive a different code sequence signal. Additionally or alternatively to one or more of the examples disclosed above, in some examples, the display further includes sense and demodulation circuitry operable to detect a touch or hover event at a touch electrode in a particular row and in a particular column based at least on a code sequence signal received by the touch electrode in the particular row and in the particular column and a difference between a first current through a first bus for the particular row and a second current through a second bus for the particular row. Additionally or alternatively to one or more of the examples disclosed above, in some examples, detecting a touch or hover event at the touch electrode in the particular row and in the particular column comprises multiplying the code sequence signal received by the touch electrode in the particular row and in the particular column by the difference between the first current and the second current. Additionally or alternatively to one or more of the examples disclosed above, in some examples, a length of each of the code sequence signals is greater than or equal to a number of columns of touch electrodes. Additionally or alternatively to one or more of the examples disclosed above, in some examples, a first stimulation signal for a row is generated by a first stimulation signal generator, and wherein a second stimulation signal for the row is generated by a second stimulation signal generator. Additionally or alternatively to one or more of the examples disclosed above, in some examples, the first stimulation signal for the row and the second stimulation signal for the row are 180-degrees out of phase from each other. Additionally or alternatively to one or more of the examples disclosed above, in some examples, a first stimulation signal for a row is generated by a stimulation signal generator, and wherein a second stimulation signal for the row is generated by the stimulation signal generator.

Some examples of the disclosure are directed to an integrated touch sensitive display comprising: a plurality of touch electrodes arranged in rows and columns; a plurality of buses; and a plurality of transmission gates operable to couple only a portion of the plurality of touch electrodes to the plurality of buses at the same time, wherein the portion of the plurality of touch electrodes includes a number of touch electrodes equal to a number of buses in the plurality of buses. Additionally or alternatively to one or more of the examples disclosed above, in some examples, the plurality of transmission gates are operable to sequentially couple portions of the plurality of touch electrodes to the plurality of buses. Additionally or alternatively to one or more of the examples disclosed above, in some examples, the plurality of transmission gates are operable to sequentially couple portions of the plurality of touch electrodes to the plurality of buses. Additionally or alternatively to one or more of the examples disclosed above, in some examples, the plurality of touch electrodes are formed from a first metal layer of the integrated touch sensitive display, and wherein the plurality of transmission gates are coupled to the plurality of touch electrodes by a plurality of traces formed in a second metal layer of the integrated touch sensitive display. Additionally or alternatively to one or more of the examples disclosed above, in some examples, the display can further include sense circuitry coupled to the plurality of buses, wherein the plurality of transmission gates and the sense circuitry are included within a plurality of integrated circuits. Additionally or alternatively to one or more of the examples disclosed above, in some examples, each of the plurality of integrated circuits further comprises display driver circuitry for updating a display of the integrated touch sensitive display. Additionally or alternatively to one or more of the examples disclosed above, in some examples, the display can further include sense circuitry coupled to the plurality of buses, wherein the plurality of transmission gates and the sense circuitry are included within a first integrated circuit, and wherein the integrated touch sensitive display further comprises a second integrated circuit operable to update a display of the integrated touch sensitive display.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A touch sensor panel comprising
a plurality of touch electrodes located in a plurality of regions of the touch sensor panel, wherein:
   each of the plurality of touch electrodes is:
      located in a respective region of the plurality of regions that corresponds to the respective touch electrode, and
      associated with respective circuitry located in the respective region of the touch sensor panel,
   the respective circuitry is configured to, in response to receiving at the respective circuitry a code sequence signal, couple in the respective region of the touch sensor panel an associated touch electrode to one of a first voltage source and a second voltage source, different from the first voltage source, based on the code sequence signal, and
   each respective circuitry is configured to receive a different code sequence signal, wherein sense circuitry is operable to generate a current sense signal based on a difference between a first current through the first voltage source and a second current through the second voltage source.

2. The touch sensor panel of claim 1, further comprising demodulation circuitry operable to demodulate the current sense signal to determine a capacitance at a touch electrode of the plurality of touch electrodes based on a code sequence signal received by respective circuitry associated with the touch electrode of the plurality of touch electrodes.

3. The touch sensor panel of claim 1, wherein code sequence signals received by respective circuitry associated with each of the plurality of touch electrodes comprise the same sequence of values, and wherein each of the code sequence signals received by respective circuitry associated with the plurality of touch electrodes has a different phase offset.

4. The touch sensor panel of claim 1, wherein code sequence signals received by respective circuitry associated with the plurality of touch electrodes each comprise a pseudo inverse code or a Kasami code.

5. The touch sensor panel of claim 1, wherein a length each of the code sequence signals received by respective circuitry associated with the plurality of touch electrodes is greater than or equal to a number of touch electrodes in the plurality of touch electrodes.

6. The touch sensor panel of claim 1, wherein respective circuitry associated with each of the plurality of touch electrodes comprises a latch coupled to receive a code sequence signal associated with the touch electrode.

7. The touch sensor panel of claim 6, wherein the touch electrodes are arranged in rows and columns, and wherein latches of respective circuitry associated with touch electrodes in the same column are coupled in series.

8. The touch sensor panel of claim 1, wherein:
the respective circuitry associated with a touch electrode of the plurality of touch electrodes comprises a transmission gate,
the plurality of touch electrodes, including other touch electrodes, are arranged in rows and columns,
transmission gates of respective circuitry associated with touch electrodes in the same row are operable to couple their associated touch electrode to receive either a first stimulation signal from a first bus, coupled to the first voltage source, of the row or a second stimulation signal from a second bus, coupled to the second voltage source, of the row based on the code sequence signal,
transmission gates of respective circuitry associated with touch electrodes in the same column are coupled to receive the same code sequence signal; and
transmission gates of respective circuitry associated with touch electrodes in each row are coupled to receive a different code sequence signal.

9. The touch sensor panel of claim 8, further comprising sense and demodulation circuitry operable to detect a touch or hover event at a touch electrode in a particular row and in a particular column based at least on a code sequence signal received by respective circuitry associated with the touch electrode in the particular row and in the particular column and a difference between a first current through a first bus for the particular row and a second current through a second bus for the particular row.

10. The touch sensor panel of claim 9, wherein detecting a touch or hover event at the touch electrode in the particular row and in the particular column comprises multiplying the code sequence signal received by respective circuitry associated with the touch electrode in the particular row and in the particular column by the difference between the first current and the second current.

11. The touch sensor panel of claim 8, wherein a length of each of the code sequence signals is greater than or equal to a number of columns of touch electrodes.

12. The touch sensor panel of claim 8, wherein a first stimulation signal for a row is generated by a first stimulation signal generator, and wherein a second stimulation signal for the row is generated by a second stimulation signal generator.

13. The touch sensor panel of claim 12, wherein the first stimulation signal for the row and the second stimulation signal for the row are 180-degrees out of phase from each other.

14. The touch sensor panel of claim 8, wherein a first stimulation signal for a row is generated by a stimulation signal generator, and wherein a second stimulation signal for the row is generated by the stimulation signal generator.

15. A method comprising:
receiving, at a respective circuitry, a code sequence signal, wherein:
the respective circuitry is located in a respective region of a plurality of regions of the touch sensor panel that corresponds to a respective touch electrode of a plurality of touch electrodes of the touch sensor panel, and
the respective touch electrode is located in the respective region of the plurality of regions that corresponds to the respective touch electrode and is associated with the respective circuitry;
in response to receiving the code sequence signal, coupling in the respective region of the touch sensor panel the respective touch electrode to one of a first voltage source and a second voltage source, different from the first voltage source, based on the code sequence signal; and
generating a current sense signal based on a difference between a first current through the first voltage source and a second current through the second voltage source.

16. An electronic device comprising:
a touch sensor panel having a plurality of touch electrodes located in a plurality of regions of the touch sensor panel, wherein:
each of the plurality of touch electrodes is:
located in a respective region of the plurality of regions that corresponds to the respective touch electrode, and
associated with respective circuitry located in the respective region of the touch sensor panel,
the respective circuitry is configured to, in response to receiving at the respective circuitry a code sequence signal, couple in the respective region of the touch sensor panel an associated touch electrode to one of a first voltage source and a second voltage source, different from the first voltage source, based on the code sequence signal, and
each respective circuitry is configured to receive a different code sequence signal; and
sense circuitry operable to generate a current sense signal based on a difference between a first current through the first voltage source and a second current through the second voltage source.

* * * * *